United States Patent [19]

Melk

[11] Patent Number: 5,322,162

[45] Date of Patent: Jun. 21, 1994

[54] COMPACT CD CASE

[75] Inventor: Thomas J. Melk, Chicago, Ill.

[73] Assignee: Outer Circle Products, Ltd., Chicago, Ill.

[21] Appl. No.: 81,398

[22] Filed: Jun. 22, 1993

[51] Int. Cl.[5] .............................................. B65D 85/57
[52] U.S. Cl. .................................. 206/310; 206/45.13; 206/309; 206/311
[58] Field of Search .................... 206/45.13, 309, 310, 206/311, 312, 313

[56] References Cited

U.S. PATENT DOCUMENTS

| | | | |
|---|---|---|---|
| 4,778,047 | 10/1988 | Lay | 206/309 X |
| 4,844,260 | 7/1989 | Jaw | 206/311 X |
| 5,022,516 | 6/1991 | Urban et al. | 206/45.13 |
| 5,099,995 | 3/1992 | Karakane et al. | 206/311 X |
| 5,176,250 | 1/1993 | Cheng | 206/309 |
| 5,188,228 | 2/1993 | Barrett | 206/310 |
| 5,246,107 | 9/1993 | Long et al. | 206/313 |
| 5,269,409 | 12/1993 | Brandt et al. | 206/311 X |

FOREIGN PATENT DOCUMENTS 2192614 1/1988 European Pat. Off. .
0492421 7/1992 United Kingdom .

OTHER PUBLICATIONS

MacWAREHOUSE Catalog vol. 19.0, p. 64, Jan. 1993.

Primary Examiner—William I. Price
Attorney, Agent, or Firm—Trexler, Bushnell, Giangiorgi & Blackstone, Ltd.

[57] ABSTRACT

A carrying case is provided for storing and transporting a plurality of relatively flat, thin items such as compact discs or the like. The carrying case comprises an outer shell defining an enclosed compartment for housing a plurality of items and having a top shell member and a bottom shell member of complementary configuration. A pair of coaxially aligned, spaced apart annular members project from each of the top and bottom shell members and are coaxially alignable for defining a hinge axis therethrough about which the top and bottom shell members may be hingedly coupled for movement between an open condition and a closed condition for respectively accessing and closing the compartment. A plurality of similar, generally flat tray members configured for fitting within said compartment, each has a pair of coaxially aligned, spaced apart hinge knuckles located for positioning in coaxial alignment the hinge knuckles of each of the other trays and with the annular members of the top and bottom shell members for receiving a hinge pin therethrough, thereby aligning the tray members between the top and bottom shells in a facewise stacked condition when the top and bottom shell members are in the closed condition, and permitting individual hinged access to the trays when the top and bottom shell members are in the open condition.

15 Claims, 6 Drawing Sheets

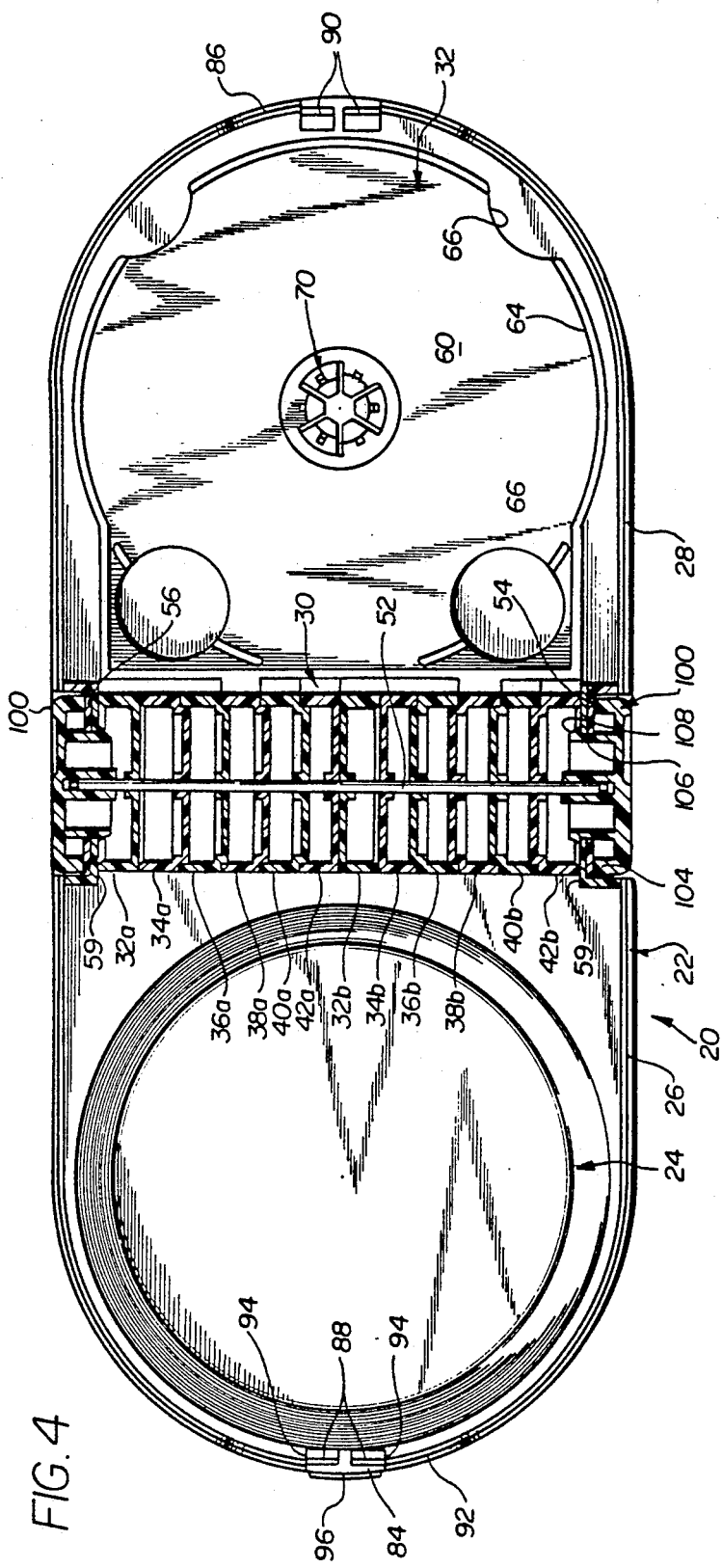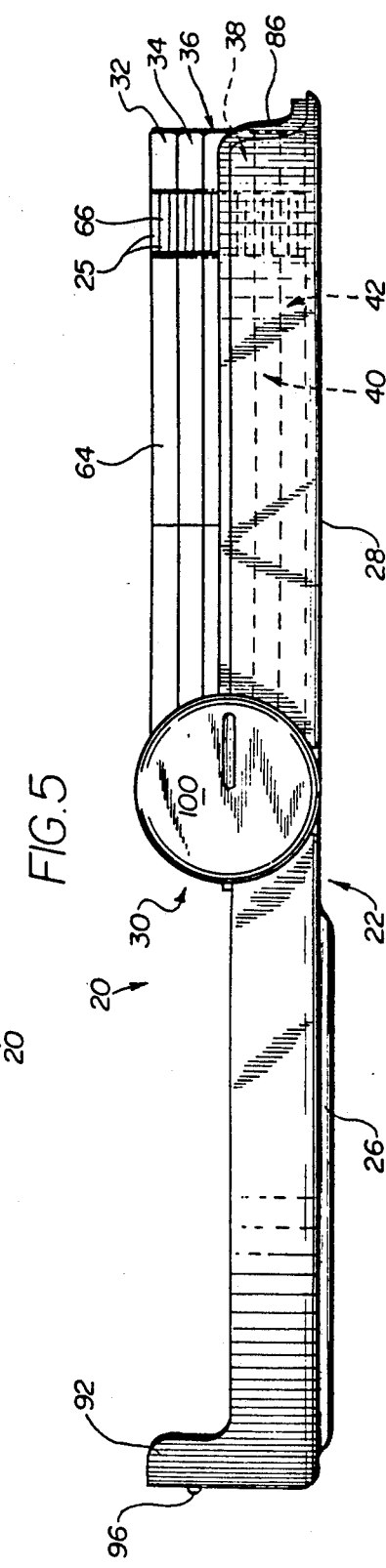

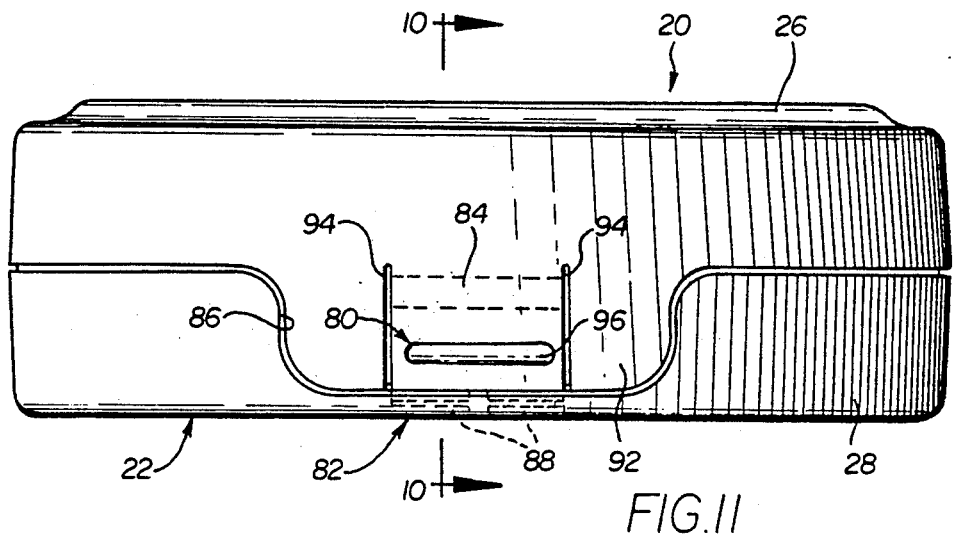
FIG.9
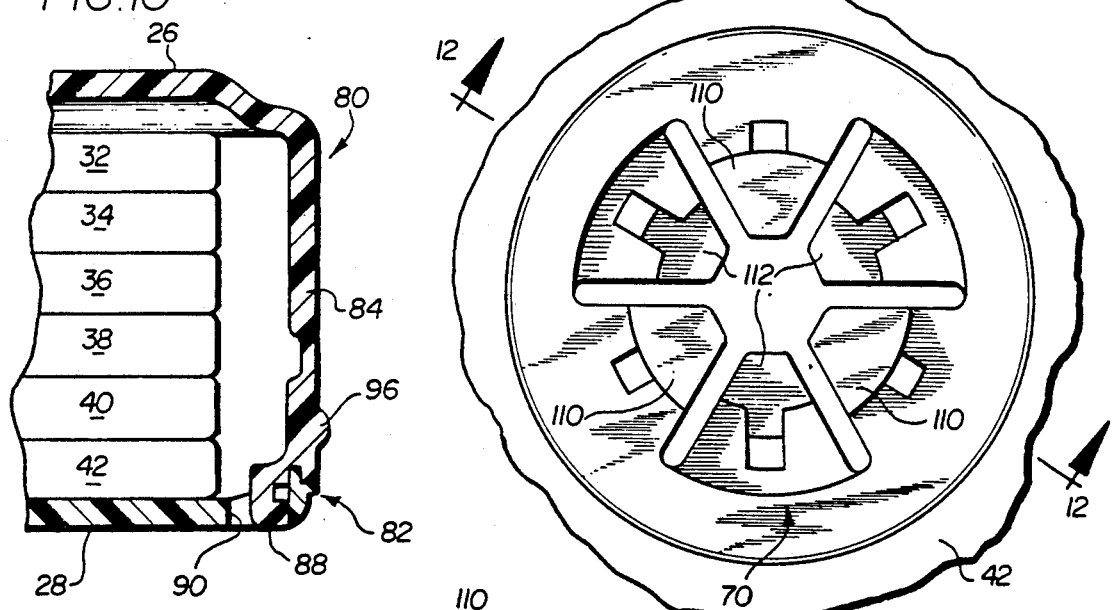
FIG.10
FIG.11
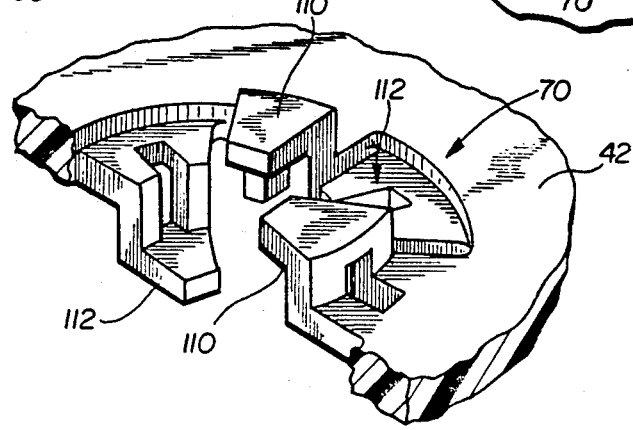
FIG.12

COMPACT CD CASE

BACKGROUND OF THE INVENTION

This invention is directed generally to a carrying case, and more particularly to a carrying case for storing and transporting a plurality of like, relatively flat, thin items such as compact discs (CDs) or the like. While the present invention may have applications other than the carrying of compact discs, the ensuing description will be facilitated by specific reference to the problem of providing a carrying case for compact discs.

Compact discs have all but replaced vinyl long-playing records, and in many instances are also rapidly overtaking audio tape cassettes in popularity, primarily because of the quality of the audio sound produced by CDs. With increasing popularity and sales of CDs, has come an increasing popularity of portable CD players. These CD players range from relatively small compact players which may be carried on the person and listened to through earphones to relatively large units, often including AM/FM radio and extensive controls and incorporating loudspeakers. Such portable players may be arranged for operation either from AC household current or by DC batteries to achieve portability. Increasingly, automotive audio systems are also being provided with CD players.

Accordingly, there is an increasing need to provide suitable carrying cases for storing and transporting multiple CDs for use in home players, in portable players and in automotive players, at the option of the consumer.

A number of features are desirable in such CD carrying cases. Initially, the case must be capable of holding a plurality of CDs in a protected enclosure. Thus, the case should include a protective outer portion which completely surrounds the CDs carried therein and protects them against damage in the event the carrying case is roughly handled, dropped, or the like. Additionally, it is convenient for the CDs to be disposed within the case in such a way that the individual CDs can be reviewed and identified without removing them from the case, to aid in selecting a particular CD from those carried in the case. Depending upon the orientation in which the CD's are carried, such identification prior to removal may be facilitated or inhibited. While it is possible to view the titles by observing only the edges of the CDs when in individual cases or "jewel boxes" with printed labels or inserts intact and in place, in many instances, it is nonetheless somewhat difficult to distinguish one CD from the next when the cases are closely spaced in a parallel or stacked orientation. It is much more convenient to view the individual faces of the CDs to identify and review all of the information which is printed upon the face of the CD itself. Such "face-on" viewing is the only way to identify the CD itself, when not in its "jewel box" with the printed insert intact and in place.

The carrying case of the invention, in addition to the foregoing, provides further desirable features. For example, the carrying case of the invention provides positive retaining means for retaining the CDs in place during handling and transport of the case, even when the opened case is tipped or oriented in various orientations. Also, the carrying case of the invention provides storage space for a maximum number of CDs within the minimum amount of space while yet providing secure mounting of each of the CDs to carrying means or trays within the case. Additionally, the carrying case of the invention provides a convenient two-piece "clam shell" type outer case design utilizing relatively simple and few parts and avoiding mechanical hardware such as screws or other fasteners, complex handles, handle hardware, latching hardware and the like. Rather, the carrying case of the invention is constructed utilizing a minimum number of parts which are primarily of a molded plastic construction and may be relatively simply assembled and interengaged by hand, without the aid of specialized tools, fixtures, or the like, by relatively unskilled workers.

Furthermore, the carrying case of the invention is capable of opening in a flat condition for positioning on a flat surface to review the CDs carried therein. Conversely, the carrying case of the invention readily folds in a clam shell configuration and provides simple yet effective releasable latching means for holding the clam shell case together in a closed condition for transport and storage.

OBJECTS AND SUMMARY OF THE INVENTION

Accordingly, it is a general object of the invention to provide a novel and improved carrying case for CDs or similar objects.

Further objects of the present invention are to provide a carrying case which solves the problems and offers the convenient features hereinabove discussed.

Briefly, and in accordance with the foregoing, the present invention comprises a carrying case for storing and transporting a plurality of relatively flat, thin items such as compact discs or the like, said carrying case comprising: an outer shell defining an enclosed compartment for housing a plurality of said items; said outer shell having a top shell member and a bottom shell member of complementary configuration to said top shell member; a pair of coaxially aligned, spaced apart annular members projecting from each of said top and bottom shell members, said pairs of annular members being coaxially alignable for defining a hinge axis therethrough about which said top and bottom shell members may be hingedly coupled for movement between an open condition and a closed condition for respectively accessing and closing said compartment; an elongate hinge pin; a plurality of similar, generally flat tray members configured for fitting within said compartment, each of said tray members having a pair of coaxially aligned, spaced apart hinge knuckles, the pair of hinge knuckles of each of said trays being located for positioning in coaxial alignment with the annular members of said top and bottom shell members and also with the hinge knuckles of each of the other trays for receiving said hinge pin therethrough, thereby aligning the tray members between said top and bottom shells in a facewise stacked condition when said top and bottom shell members are in said closed condition, and permitting individual hinged access to said trays when said top and bottom shell members are in said open condition.

BRIEF DESCRIPTION OF THE DRAWINGS

The features of the present invention which are believed to be novel are set forth with particularity in the appended claims. The organization and manner of operation of the invention, together with further objects and advantages thereof may best be understood by reference to the following description, taken in connection with the accompanying drawings in which like reference numerals identify like elements, and in which:

FIG. 4 is a plan view, partly in section, of the case in an open condition;

FIG. 5 is an end view, partially in section, of the case in an open condition;

FIG. 9 is a front elevation of the carrying case showing further details of a latch portion thereof;

FIG. 10 is an enlarged partial sectional view taken generally in the plane of the line 10—10 of FIG. 9;

FIG. 11 is a partial plan view of the tray of FIG. 6 showing further details of a hub portion thereof;

FIG. 12 is a sectioned perspective view taken generally along the line 12—12 of FIG. 11;

DETAILED DESCRIPTION OF THE ILLUSTRATED EMBODIMENT

Figure 1:
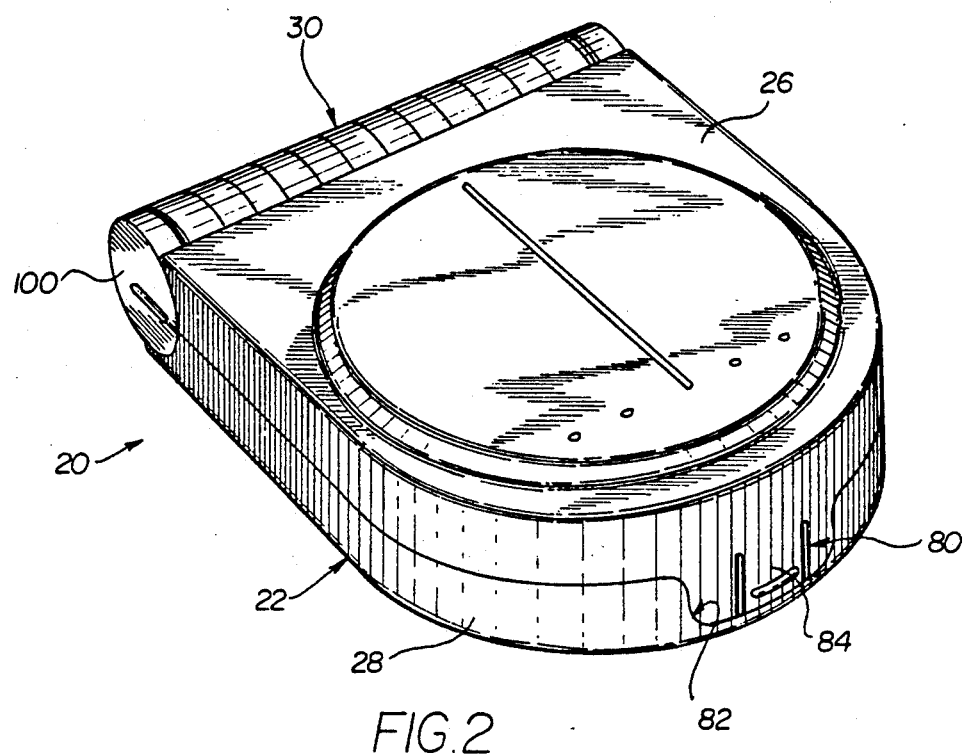
FIG. 1 is a perspective view of a carrying case in accordance with this invention in a closed condition.
Figure 2:
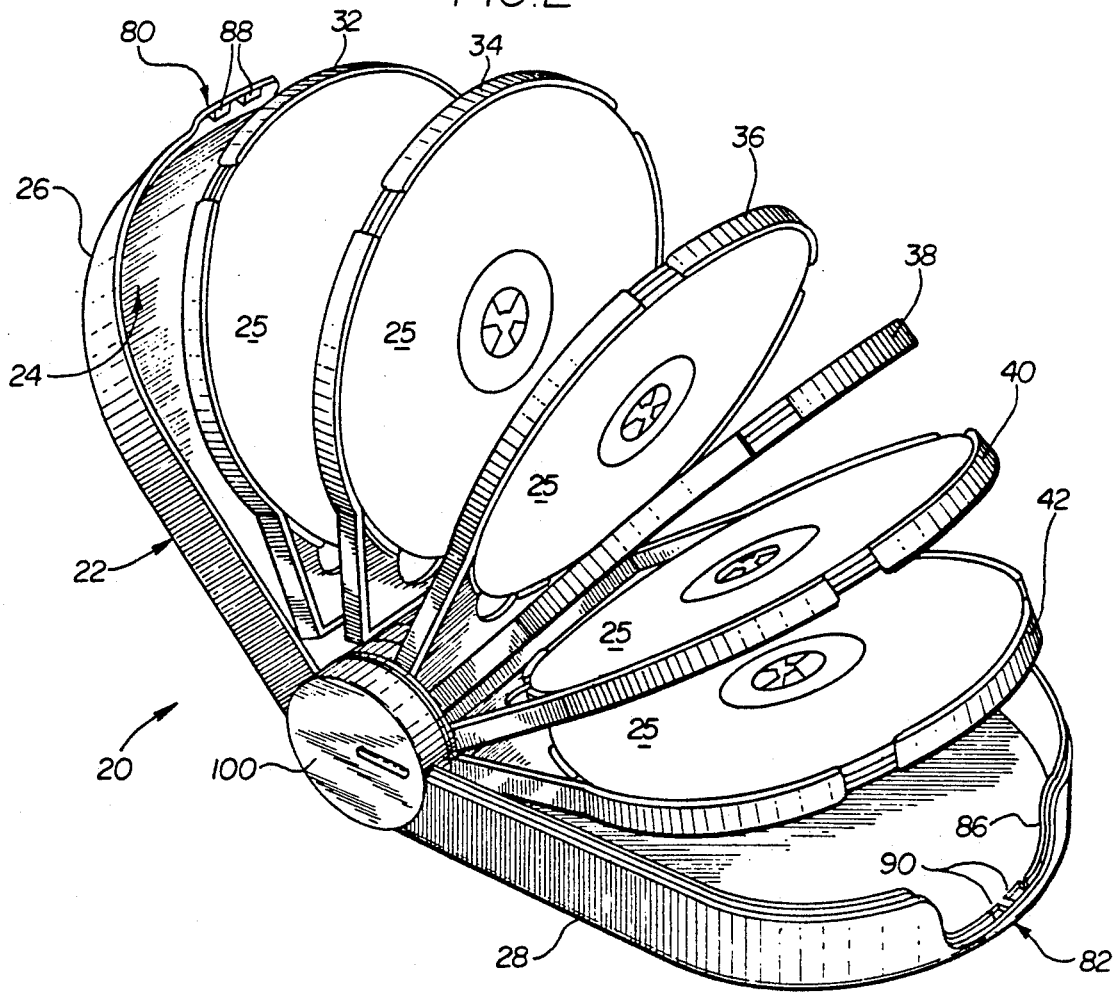
FIG. 2 is a perspective view similar to FIG. 1 showing the carrying case of the invention in an open condition.
Figure 3:
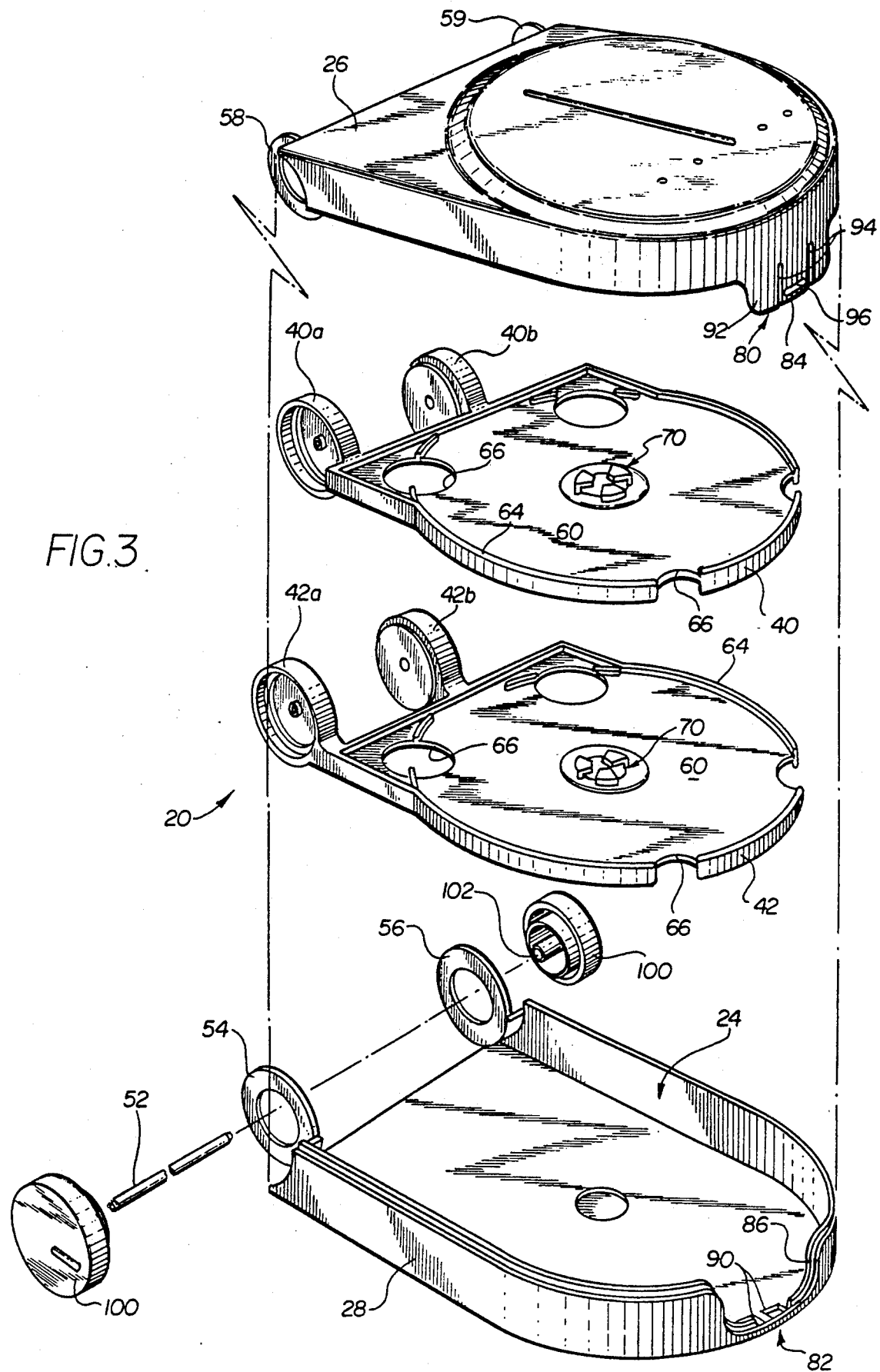
FIG. 3 is an exploded partial perspective view showing further features of the invention.

Referring now to the drawings, and initially to FIGS. 1-3, a carrying case in accordance with the invention for storing and transporting a plurality of articles such as compact discs (CDs) or the like is designated generally by the reference numeral 20. The carrying case 20 includes an outer shell 22 which defines an enclosed compartment 24 for housing a plurality of items such as CDs 25. The outer shell has a clam shell type configuration, comprising a top shell member or half 26 and a bottom shell member or half 28 which are hingedly joined along one edge by a hinge structure 30. The hinged joining of the top and bottom shell members 26, 28 is such that they are hingedly moveable between an open condition as illustrated in FIGS. 4 and 5 and a closed condition as illustrated in FIG. 1. FIG. 2 illustrates an intermediate or partially opened condition of the top and bottom shell members 26, 28.

It will be noted that in the open condition illustrated in FIGS. 4 and 5 the outer shell can be laid flat on a suitable surface to facilitate access to the CDs 25 carried therein. As also shown in FIG. 2, the CDs are carried upon a plurality of tray members 32, 34, 36, 38, 40 and 42 which are substantially similar, but as will seen later present somewhat different hinge structures, such that all of these trays 32-42 are hingedly moveable and, in fact, form individual portions or segments of the hinge structure 30. Thus, the trays 32-42 are individually hingedly moveable between the top and bottom shell members 26, 28 to permit individual accessing of the CDs carried upon these trays. Moreover, the trays can for example be fanned out in the fashion shown in FIG. 2 to permit quick access and/or review of the CDs carried on the individual trays. It will be noted that the trays are hingedly moveable to a facewise stacked condition as best viewed in FIG. 5 to permit movement of the top and bottom shell halves or members 26, 28 to the closed condition completely enclosing the trays 32-42.

As best viewed in FIG. 3, in order to achieve the hinge construction 30 illustrated in FIG. 1 and to achieve the operation of the individual trays as shown for example in FIG. 2, each of the tray members 32-34 has a pair of generally coaxially aligned, spaced apart hinge knuckles formed thereon. In FIG. 3, only two of the trays 40 and 42 are illustrated, it being understood that the structure of the remaining trays is similar to and, with respect to the hinge knuckles, complementary to that illustrated and described for the trays 40 and 42. The trays 40 and 42 bear respective pairs of coaxially aligned, spaced apart hinge knuckles 40a, 40b and 42a, 42b, respectively. Referring also to FIG. 4, it will be noted that the pairs of knuckles 40a, 40b and 42a, 42b for example of each of the trays are located for positioning in coaxial alignment with the hinge knuckles of each of the other trays to receive a common hinge pin 52 therethrough. The composite hinge 30 is thus formed of the respective hinge knuckles of each of the trays 32-42 to be enclosed within the shell 22. In the illustrated embodiment, six (6) such trays are illustrated. However, fewer or more such trays might be provided without departing from the invention.

In order to cooperatively interfit with the hinge structure 30 thus defined, each of the top and bottom shell members 26, 28 also includes a pair of coaxially aligned, spaced apart annular members 54, 56 and 58, 60 projecting therefrom. These annular members generally coaxially align with the respective hinge knuckles of the trays to define the composite hinge structure 30. Referring to FIGS. 4 and 5, it will be seen that the hinge knuckles of each of the trays is sized and located for coaxially interfitting in a facewise engagement with the hinge knuckles of an adjacent one of the trays to either side thereof. Thus, the pairs of hinge knuckles of respective ones of the trays are respectively offset both in an axial direction and in a radial direction relative to the hinge pin 52 to form the continuous hinge knuckle structure 30 when the respective hinge knuckles are engaged with the hinge pin 52. This axial offsetting of the respective hinge knuckles is such that each tray has a pair of hinge knuckles which are spaced apart but respectively interfit with hinge knuckles of adjacent trays to form the composite hinge 30 and so as to permit individual hinged movement of the respective trays. The radial offsetting of the hinge knuckles with respect to each of the trays is such as to permit the trays to stack in the facewise stacked condition as illustrated in FIG. 4 while maintaining all of the hinge knuckles coupled by the common hinge pin 52. Each of the hinge knuckles illustrated in FIG. 5 is designated by the number of the tray to which it belongs, together with the suffix a or b.

Figure 6:
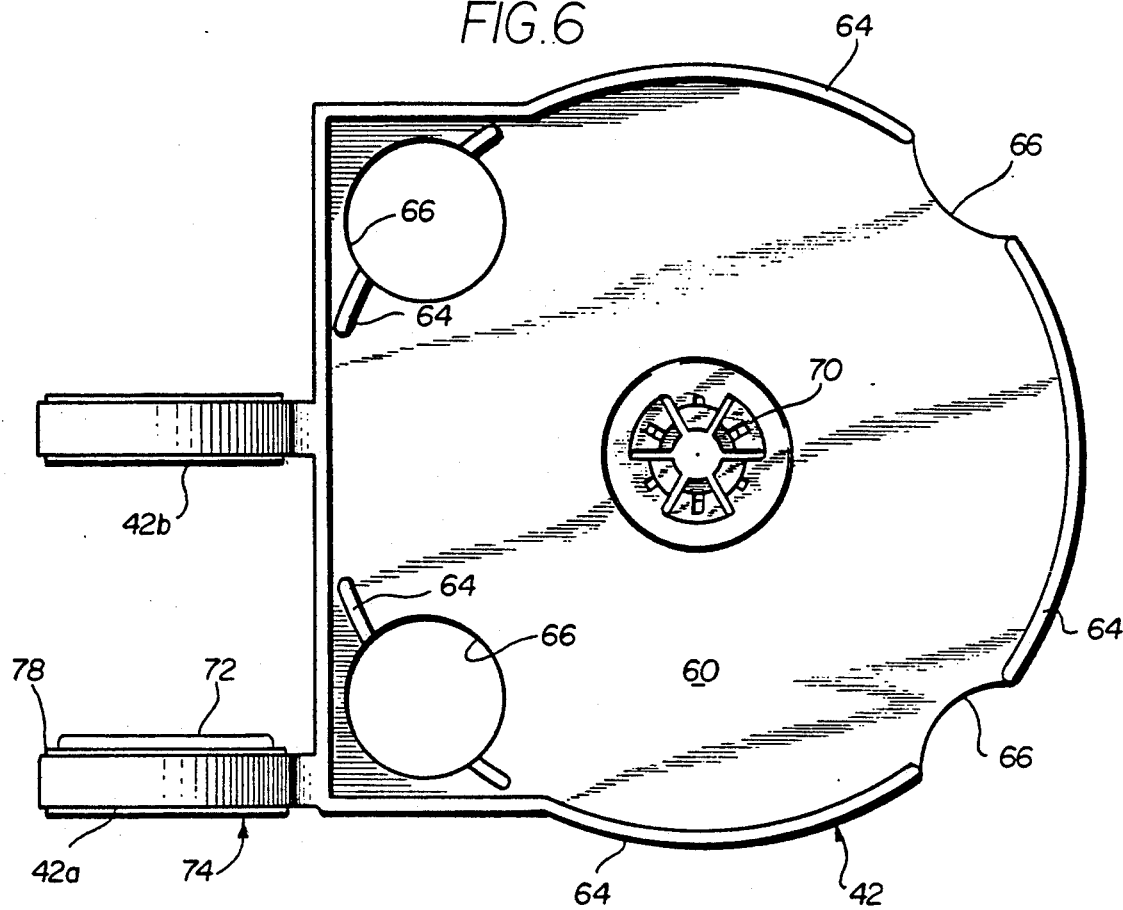
FIG. 6 is a plan view of one tray member of the carrying case of the invention.
Figure 7:
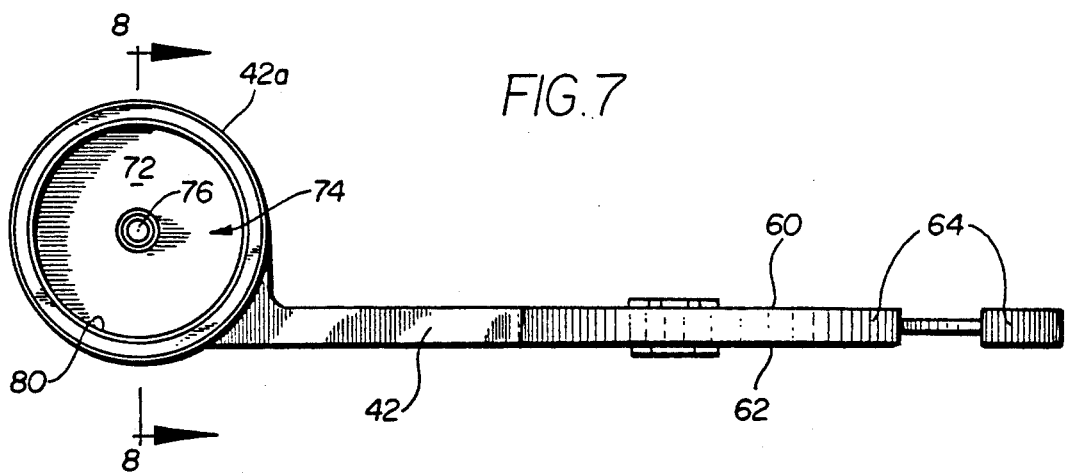
FIG. 7 is an end view of the tray of FIG. 6.
Figure 8:
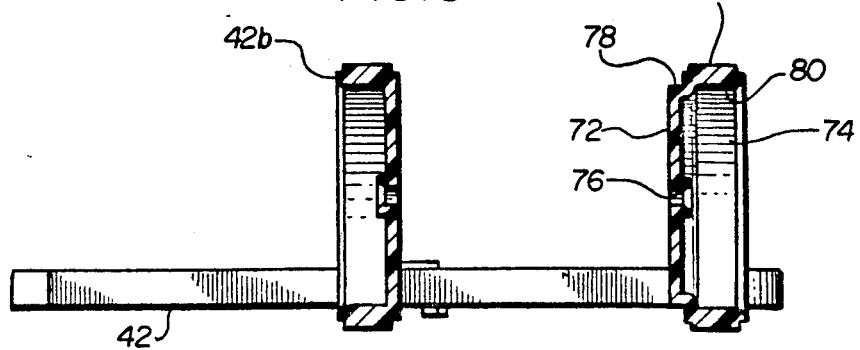
FIG. 8 is a sectional view taken generally along the line 8—8 of FIG. 7.

As best viewed in FIGS. 6-8, to which reference is now invited, each of the trays has a pair of oppositely facing generally flat or planar surfaces 60, 62, which in the illustrated embodiment are configured for receiving a compact disc in a generally flat, surface-to-surface condition therewith. Each of these surfaces 60, 62 is surrounded by a raised peripheral portion 64 which is also generally circular in configuration and sized for generally surroundingly engaging an outer edge of a CD carried on the respective one of surfaces 60, 62. The rim 64 in the illustrated embodiment is not continuous but is broken in a number of places, however, this rim 64 adequately surroundingly engages and positions the CD relative to each of surfaces 60 and 62. The rim 64 and surfaces 60, 62 may also have a plurality of peripheral cutouts 66 which extend somewhat into the surfaces 60, 62 to facilitate engagement and disengagement of a compact disc with the surfaces 60, 62. Thus, it will be seen that each tray is capable of accommodating two compact discs, one to either side thereof. In this regard, each tray includes a central hub portion 70 which is configured for releasably snappingly engaging a central opening of a compact disc to either side of the tray, that is, at either surface 60, 62 thereof. Further details of the hub structure in accordance with a preferred embodiment of the invention are illustrated in FIGS. 11 and 12 and will be further described hereinbelow.

Each of the hinge knuckles of each tray comprises a generally hollow cylindrical member which is relatively short in the axial direction. The hinge knuckle 42a of FIG. 8 will be described in detail, being understood that each of the hinge knuckles of each tray is substantially similar in configuration. Hinge knuckle 42a has a closed end 72 and an open end 74. A through central opening 76 is provided in the closed end 72 for surroundingly engaging and receiving the hinge pin 52 therethrough. An annular, radially inwardly stepped portion 78 is also defined about the closed end 72 of the hinge knuckle 42a. The outer diameter of the stepped portion 78 is such that it rotatably interfits with an inner diameter 80 at the open end 74 of the next adjacent hollow hinge knuckle. Thus, successive adjacent ones of the hinge knuckles rotatably interfit about respective stepped surfaces 78 at closed ends 72 and inner diameters 80 of their open ends 74, respectively.

However, all of the hinge knuckles need not be formed in the fashion described above for hinge knuckle 42a, as illustrated with respect to hinge knuckle 42b, for example. As also illustrated in FIG. 4 with respect to hinge knuckles 32a, 32b, 34b and 42a the stepped portion 78 may be omitted and at some points in the composite hinge structure 30, adjacent hinge knuckles may merely abut in face-to-face condition rather than having stepped portions nested within open ends of adjacent hinge knuckles. It will be seen that this face-to-face abutting condition is the case as between hinge knuckles 32b and 42a for example in FIG. 4. Similarly, respective hinge knuckles 32a and 34b also lack the stepped portions such as stepped portions 78 of hinge knuckle 42a and thus these knuckles abut the open end portions of adjacent hinge knuckles 34a and 32b, respectively about their peripheral edges, that is, without achieving a nested relationship therewith. It will be recognized that the extension of the hinge pin 52 through the coaxially aligned openings 76 of all of the hinge knuckles achieves the desired coaxial alignment thereof.

As shown in further detail in FIGS. 9 and 10, the top and bottom shell members include cooperating releasable latching means 80, 82 for releasably engaging the top shell member with the bottom shell member when they are in the closed condition. These cooperating latching means include a wall 92 which has a pair of parallel slits 94 defining a projecting resilient tongue member 84 on the top shell member 26 and a complementary cutout portion 86 formed in the bottom shell member 28 for receiving projecting wall 92. It should be noted that the locations of the projecting wall 92 and cutout portion 86 may be reversed with respect to the top and bottom shell members without departing from the invention.

The resilient tongue member 84 has a pair of projecting locking tabs 88 formed thereon. Cooperatively, the bottom shell member 28 has a pair of through apertures 90 which are located and configured for receiving the locking tabs 88 snappingly interfitted therethrough. The tongue member 84 is resiliently deformable for permitting engagement and disengagement of the tabs 88 relative to the apertures 90 for respectively latching and unlatching the top and bottom shell members 26, 28 when they are in the closed condition. In the illustrated embodiment, the resilient tongue member 84 is centered in the somewhat wider projecting wall portion 92 of the top shell member 26 which projecting wall portion 92 is sized and located to form a complementary fit with the cutout portion 86 in the bottom shell member 28. As mentioned above, the resilient tongue member 84 is generally defined by a pair of parallel vertically disposed slits 94 in the projecting wall member 92. An additional projecting raised ridge or projection 96 may be also be provided on the outer surface of the tongue 84 to provide a visual cue for engagement and manual depression thereof for releasing locking tabs 88 from the apertures 90.

Referring again briefly to FIGS. 3 and 4, respective outer axial ends of the hinge structure 30 are provided with a pair of substantially identical end caps 100. Each end cap 100 defines a central bore 102 for receiving the hinge pin 52. The end caps 100 are configured for overlying and snappingly rotatably engaging the annular members 54, 56 and 58, 59 of the respective top and bottom shell members 26, 28. That is, these annular members 54, 56 and 58, 59 are respectively axially offset and assembled with the end caps 100 in such a way that they are rotatable relative to each other and relative to end caps 100 to permit movement of the top and bottom shell members between the open and closed conditions. This snapping engagement of the end caps 100 with the annular members of the shells and the engagement thereof with the hinge pin 52 results in holding the top and bottom shell members in assembled condition with the tray members, with the annular members of the top and bottom shell members in coaxial alignment with the hinge knuckles of the tray members.

It will be seen that each of the end caps 100 includes an outer axially projecting annular wall 104 which overlies the respective annular members 54, 56 and 58, 59 of the top and bottom shell members and completely covers their central through openings, extending almost to the outer peripheral edges thereof. Each cap 100 further includes an axially projecting annular skirt member 106 which is located radially inside of wall 104 and is of similar outer diameter to the inner diameter of the respective annular members 54, 56 and 58, 59. Each skirt member 104 has at its axial end a radially outwardly projecting barb portion 108 to snappingly interfit through the respective annular members 54, 58 and 56, 59 at opposite axial ends of the hinge structure 30.

As best viewed in FIGS. 11 and 12, the compact disc-engaging hub members comprise a circular array of oppositely axially projecting resiliently deformable hub segments 110, 112. These segments 110, 112 alternate about the circumference of the hub 70 such that segments 110 all project to one side of the tray 42 whereas the segments 112 all project to the opposite side of the tray 42. The formation of the hub with these alternately projecting hub segments is substantially identical for all of the trays, such that each tray can simultaneously retain a compact disc to either side thereof as mentioned hereinabove.

Figure 13:
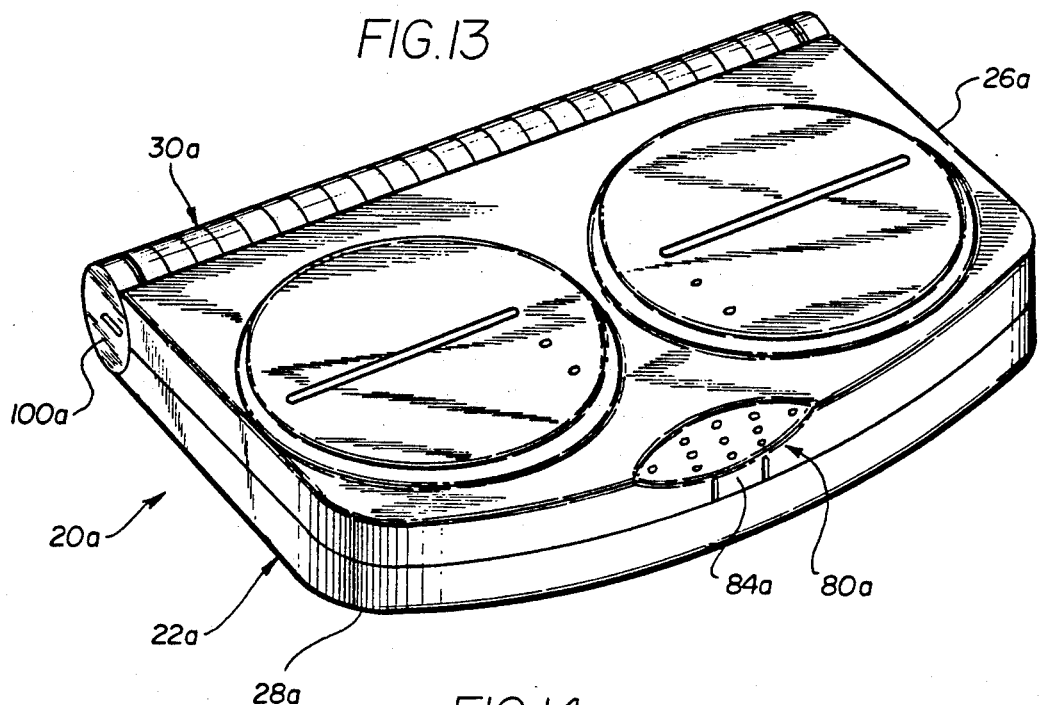
FIG. 13 is a perspective view of a case in accordance with a second embodiment of the invention in a closed condition.
Figure 14:
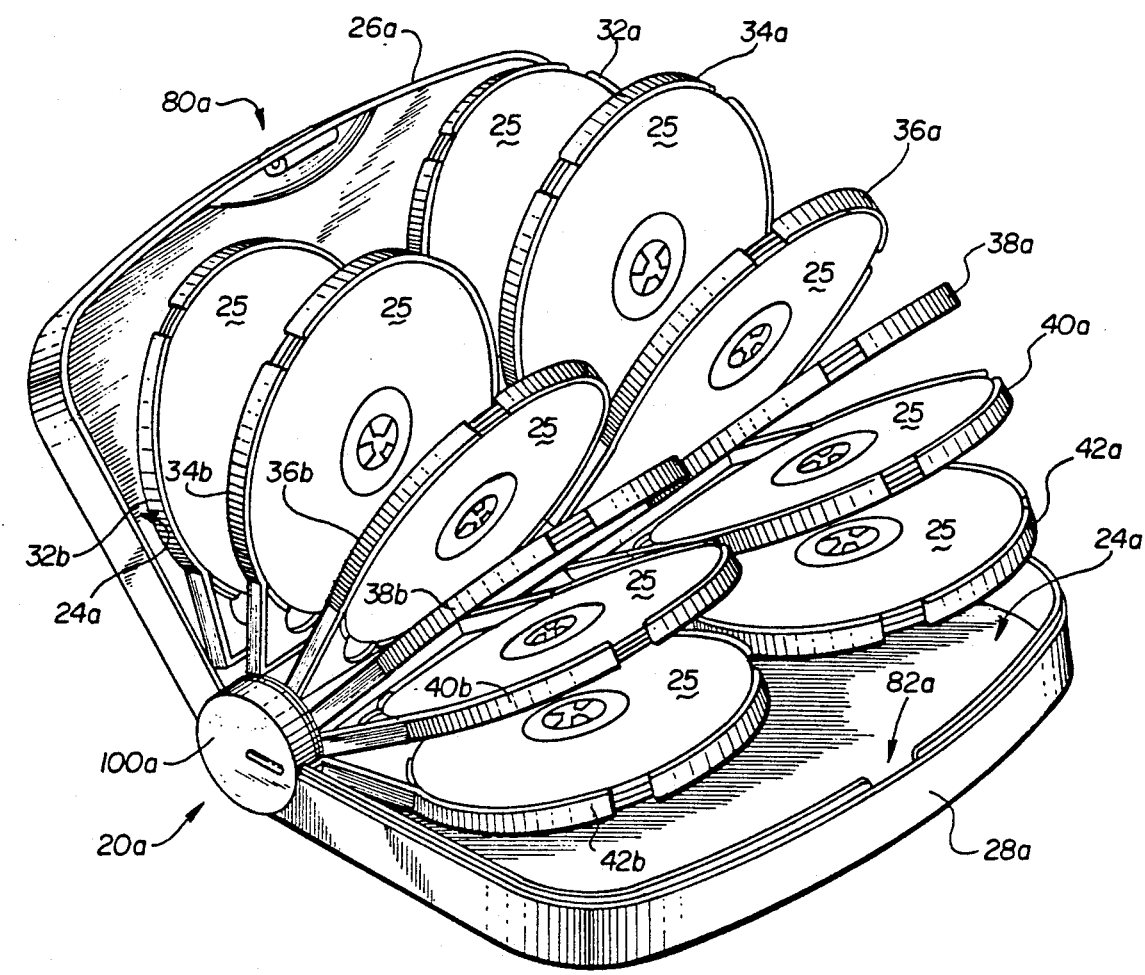
FIG. 14 is a perspective view of the carrying case of FIG. 13 in an open condition.

Referring briefly to FIGS. 13 and 14, a second embodiment of a carrying case in accordance with the invention is designated generally by the reference numeral 20a. Similar parts and components of carrying case 20a are designated by like reference numerals to those utilized hereinabove together with the suffix a. The carrying case 20a is in most respects substantially similar to the carrying case 20 previously described including the arrangement of trays 32a, 34a, etc. However, carrying case 20a is approximately double the width of carrying case 20, such that two substantially identical sets of trays 32a, 34a, etc. and 32b, 34b, etc. are housed side by side within the carrying case 20a. The outer shell member 22a including its upper and lower portions or halves 26a and 28a are therefore configured with sufficient width to permit these two sets of trays 32a, 34a etc. and 32b, 34b, etc. to be arranged in a side-by-side configuration therein, with a single continuous composite hinge assembly 30a formed collectively by all of the hinge knuckle members of these two side-by-side sets of trays.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The Invention is claimed as follows:

1. A carrying case for storing and transporting a plurality of relatively flat, thin items such as compact discs or the like, said carrying case comprising: an outer shell defining an enclosed compartment for housing a plurality of said items; said outer shell having a top shell member and a bottom shell member of complementary configuration to said top shell member; a pair of coaxially aligned, spaced apart annular members projecting from each of said top and bottom shell members, said pairs of annular members being coaxially alignable for defining a hinge axis therethrough about which said top and bottom shell members may be hingedly coupled for movement between an open condition and a closed condition for respectively accessing and closing said compartment; an elongate hinge pin; a plurality of similar, generally flat tray members configured for fitting within said compartment, each of said tray members having a pair of coaxially aligned, spaced apart hinge knuckles, the pair of hinge knuckles of each of said trays being located for positioning in coaxial alignment with the annular members of said top and bottom shell members and also with the hinge knuckles of each of the other trays for receiving said hinge pin therethrough, thereby aligning the tray members between said top and bottom shells in a facewise stacked condition when said top and bottom shell members are in said closed condition, and permitting individual hinged access to said trays when said top and bottom shell members are in said open condition.

2. A carrying case according to claim 1 wherein the pair of hinge knuckles of each of said trays is sized and located for coaxially interfitting in facewise engagement with the hinge knuckles of an adjacent facing one of said trays to either side thereof, the pairs of hinge knuckles of respective ones of said trays being respectively offset and alignable for receiving said hinge pin therethrough to form a substantially continuous hinge structure.

3. A carrying case according to claim 1 wherein each of said trays has a central hub portion configured for releasably engaging a central opening of a compact disc to either side of said tray, such that each tray can mount and support two compact discs, one to either side thereof.

4. A carrying case according to claim 2 wherein the pairs of hinge knuckles of respective ones of said trays are respectively offset both in an axial direction and in a radial direction relative to said hinge pin for forming a substantially continuous hinge knuckle when engaged with said hinge pin and for permitting said trays to stack in a facewise condition within said shell when said top and bottom shell members are in said closed condition.

5. A carrying case according to claim 1 wherein each of said hinge knuckles comprises a generally hollow cylindrical member having one closed end and one open end, and means defining a through central opening in said closed end for surroundingly engaging and receiving said hinge pin therethrough.

6. A carrying case according to claim 3 wherein each of said trays has a generally flat surface portion for receiving a compact disc thereupon and a raised peripheral rim portion extending at least partially around said flat surface portion for extending at least partially about an outer periphery of a compact disc carried thereupon.

7. A carrying case according to claim 6 wherein each of said trays has one said flat surface portion and one said raised peripheral rim portion to either side thereof for receiving a compact disc to either side thereof.

8. A carrying case according to claim 6 wherein said peripheral rim and an adjacent portion of said flat surface define a plurality of peripheral cutouts extending into said flat surface for facilitating engagement and disengagement of a compact disc with said tray.

9. A carrying case according to claim 1 wherein said top and bottom shell members include cooperating releasable latching means for releasably engaging said top shell member with said bottom shell member when the same are in said closed condition.

10. A carrying case according to claim 9 wherein said latch means includes a resilient projecting tongue member on one of said top and bottom shell members having a locking tab formed thereon, a cutout portion on the other of said top and bottom shell members for surroundingly receiving said projecting member, and a through aperture in said other of the top and bottom shell members adjacent said cutout portion for receiving said latching tab therethrough for releasably holding said top and bottom shell members in said closed condition, such that said locking tab snappingly interfits with said through aperture upon movement of said top and bottom shell members to said closed position, and wherein said resilient tongue member is resiliently deformable for disengaging said tab member from said opening to permit movement of said top and bottom shell members from said closed condition toward said open condition.

11. A carrying case according to claim 1 and further including a pair of axially outer cap members, each of said cap members including means defining a central bore for receiving said hinge pin and engagement means for snappingly rotatably engaging the annular members of said top and bottom shell members to thereby hold said top and bottom shell members together in assembled condition with said tray members, with said annular members thereof in coaxial alignment with the hinge knuckles of said tray members.

12. A carrying case according to claim 11 wherein the annular members of each of said top and bottom shell members are located and sized for overlying the hinge knuckles of said tray members to either axial end of the hinge formed thereby when the same are aligned axially for receiving said hinge pin therethrough, the annular members of the top and bottom shell members being respectively offset for interfitting with each other in a face-to-face condition for axially aligning inner diameters thereof to receive said engagement means of said end cap members snappingly engaged therethrough.

13. A carrying case according to claim 5, wherein selected ones of said hinge knuckles further include an annular, radially inwardly stepped portion about said closed end thereof for rotatably interfitting with an open end of an adjacent hinge knuckle.

14. A carrying case according to claim 1, and further including a second plurality of tray members of like configuration to and located side-by-side with said other outer shell member being rigid to house both of said pluralities of tray members.

15. A carrying case according to claim 4, and further including a second plurality of tray members of like configuration to and located side-by-side with said other outer shell member being rigid to house both of said pluralities of tray members.

* * * * *